(12) United States Patent
Laughner et al.

(10) Patent No.: US 6,498,214 B2
(45) Date of Patent: Dec. 24, 2002

(54) SOFT TOUCH TPO COMPOSITIONS COMPRISING POLYPROPYLENE AND LOW CRYSTALLINE ETHYLENE COPOLYMERS

(75) Inventors: Michael K. Laughner, Lake Jackson, TX (US); Deepak R. Parikh, Singapore (SG)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/933,693

(22) Filed: Aug. 21, 2001

(65) Prior Publication Data

US 2002/0107328 A1 Aug. 8, 2002

Related U.S. Application Data

(60) Provisional application No. 60/226,848, filed on Aug. 22, 2000.

(51) Int. Cl.⁷ ............... C08L 23/00; C08L 23/04; C08L 9/00; C08L 25/02; C08L 45/00

(52) U.S. Cl. ............ 525/191; 525/216; 525/232; 525/240; 525/241

(58) Field of Search ................. 525/191, 216, 525/232, 240, 241

(56) References Cited

U.S. PATENT DOCUMENTS 5,773,106 A * 6/1998 deGroot et al. ............. 428/35.7
6,323,285 B1 * 11/2001 Johnston et al. ............ 525/240

* cited by examiner

*Primary Examiner*—Nathan M. Nutter (57) ABSTRACT

Thermoplastic polyolefin compositions useful for soft touch applications comprise, in weight percent based upon the weight of components A and B, about:

A. 99 to about 1 percent of at least one polypropylene homopolymer or copolymer; and B. 99 to about 1 percent of at least one homogeneously branched ethylene/α-olefin copolymer in which the α-olefin contains at least 4 carbon atoms and the homogeneously branched copolymer has a crystallinity of less than about 3 percent.

2 Claims, 7 Drawing Sheets

SOFT TOUCH TPO COMPOSITIONS COMPRISING POLYPROPYLENE AND LOW CRYSTALLINE ETHYLENE COPOLYMERS

CROSS-REFERENCE TO RELATED APPLICATIONS

This application claims the benefit of U.S. Provisional Application No. 60/226,848 filed Aug. 22, 2000.

FIELD OF THE INVENTION

This invention relates to thermoplastic polyolefin (TPO) compositions. In one aspect, the invention relates to compositions comprising at least one polypropylene and at least one ethylene copolymer while in another aspect, the invention relates to compositions in which the ethylene copolymer is of low crystallinity. In still another aspect, the invention relates to compositions in which the α-olefin of the copolymer comprises at least four carbon atoms. In yet another aspect, the invention relates to articles manufactured from the compositions.

BACKGROUND OF THE INVENTION

Soft touch applications such as automotive overshoot parts (e.g., door handles and skins such as dashboard, instrument panel and interior door skins), tooth brush handles, grips, shoe soles, and toys, are requiring ever more flexible TPO compositions. The TPO compositions presently used for soft touch applications comprise a polypropylene and a nearly amorphous ethylene/propylene (EP) or an ethylene/propylene/diene monomer (EPDM) rubber. The EP and EPDM rubbers, which have relatively high glass transition temperatures ($T_g$) and are blocky (i.e., the ethylene/propylene sequence distribution is highly regular and uniform throughout the polymer), tend to have a flexural modulus at room temperature (25° C.) that is higher than desired for the soft touch applications. To obtain the desired flexibility, these TPO compositions require the use of a plasticizer but over time the plasticizer migrates from the composition and this in turn, fogs the composition and/or results in a loss of impact and/or modulus. As such, a need and an interest exists for TPO compositions for use in soft touch applications that require little, if any, plasticizer.

SUMMARY OF THE INVENTION

According to this invention, TPO compositions useful for soft touch applications comprise, in weight percent based upon the weight of the composition, about:

A. 1 to about 99 percent of a least one polypropylene homopolymer or copolymer; and
B. 99 to about 1 percent of at least one homogeneously branched ethylene /α-olefin copolymer in which the α-olefin contains at least 4 carbon atoms and the homogeneously branched copolymer has a crystallinity of less than about 3 percent.

The polypropylenes of these TPO compositions include high and low crystallinity homopolymers and/or copolymers (e.g., propylene and ethylene), while the ethylene/α-olefin copolymers are of low crystallinity, preferably amorphous or nearly amorphous. Preferably, the ethylene copolymer is a substantially linear ethylene/α-olefin copolymer.

The TPO compositions of this invention exhibit unexpectedly lower modulus and/or higher impact and/or higher tensile properties then those exhibited by TPO compositions comprising a polypropylene and a conventional amorphous EP or EPDM rubber. These unexpected and desirable properties allow for the use of these compositions in soft touch applications with little, if any, plasticizer. When plasticizer is added, a smaller amount is added to the TPO compositions of the invention in order to obtain the same or better flexibility compared to prior plasticizer-containing EP or EPDM TPO compositions.

DETAILED DESCRIPTION OF THE INVENTION

As here used, "TPO compositions" include both cross-linked (i.e., thermoplastic vulcanates or TPVs) and uncross-linked compositions. The TPVs of this invention range from slightly cross-linked, e.g., less than about 10% gel content, to fully cross-linked, i.e., greater than 95% gel content, and they can be cross-linked in any manner, e.g., with sulfur, a phenolic, an azide, or through the action of a peroxide or radiation. The cross-linking typically is limited to the elastomer phase but in certain circumstances can include the polypropylene phase.

The polypropylene component of this invention is at least one homopolymer and/or one or more copolymers of propylene and up to about 40 mole percent, preferably up to about 20 mole percent, ethylene or other α-olefin having up to about 12 carbon atoms. If a copolymer, it can be random, block or graft. The polypropylene component of this invention has a typical melt flow rate (as determined by ASTM D-1238, Condition 230/2.16 (formerly Condition L)) of between about 0.1 and about 200, preferably between about 0.8 and about 100, and more preferably between about 1 and about 50. The polypropylene component of this invention can be made by any convenient method including traditional Ziegler-Natta catalysis and more recent metallocene catalysis.

As here used, "ethylene copolymer" and "ethylene/α-olefin copolymer" include polymers of ethylene and one or more α-olefins. Such copolymers include, for example, polymers of ethylene and an α-olefin of 4 or more carbon atom; terpolymers of ethylene and two α-olefins one of which contains 4 or more carbon atoms; terpolymers of ethylene, an α-olefin of 4 or more carbon atoms, and a polyene; and tetrapolymers of ethylene and three α-olefins at least one of which contains 4 or more carbon atoms. Examples of the α-olefins that can be used to prepare the ethylene copolymer component of the TPO compositions of this invention include 1-butene, 1-pentene, 4-methyl-1-pentene, 1-hexene, 1-octene, 1-decene, 1-dodecene, 1-tetradecene, 1-hexadecene, 1-octadecene and 1-eicosene.

The α-olefin can also contain a cyclic structure such as cyclohexane or cyclopentane, resulting in an α-olefin such as 3-cyclohexyl-1-propene (allyl-cyclohexane) and vinyl-cyclohexane. Although perhaps not α-olefins in the classical sense of the term, for purposes of this invention certain cyclic olefins, such as norbornene and related olefins, are α-olefins and can be used in place of some or all of the α-olefins described above. Similarly, styrene and its related olefins (e.g., α-methylstyrene, etc.) are α-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene (CH₃CH═CH—CH═CH₂; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

The ethylene copolymer components of the TPO compositions of this invention preferably include copolymers of ethylene and at least one α-olefin of 4 or more carbon atoms and, optionally, at least one polyene (either conjugated or nonconjugated). Examples of such ethylene copolymers include ethylene/1-butene, ethylene/1-pentene, ethylene/1-hexene, ethylene/1-octene, and ethylene/2-norbornene. Examples of preferred terpolymers include ethylene/propylene/1-octene, ethylene/1-butene/1-octene, ethylene/1-butene/5-ethylidene-2-norbornene, ethylene/1-butene/styrene, ethylene/1-octene/5-ethylidene-2-norbornene, ethylene/1-butene/7-methyl-1,6-octadiene, and ethylene/1-octene/1,3-pentadiene, ethylene/1-butene/1,2,5-hexatriene. Examples of preferred tetrapolymers include ethylene/propylene/1-octene/diene (e.g. ENB), ethylene/butene/1-octene/diene and ethylene/1-butene/mixed dienes, e.g. ethylene/1-butene/5-ethylidene-2-norbornene/piperylene. In addition, these ethylene copolymers can include minor amounts, e.g. 0.05–0.5 percent by weight, of long chain branch enhancers, such as 2,5-norbornadiene (aka bicyclo [2,2,1]hepta-2,5-diene), diallylbenzene, 1,7-octadiene (H₂C═CH(CH₂)₄CH═CH₂), and 1,9-decadiene (H₂C═CH(CH₂)₆CH═CH₂). More preferred ethylene copolymer components of the TPO compositions of this invention include copolymers of ethylene and at least one of 1-butene, 1-hexene and 1-octene.

Typically, the ethylene copolymer component of the TPO compositions of this invention comprises at least about 20, preferably at least about 30 and more preferably at least about 40, weight percent ethylene; at least about 15, preferably at least about 25 and more preferably at least about 30, weight percent of at least one α-olefin of 4 or more carbons atoms; and, if a polyene-containing terpolymer, greater than 0.01, preferably at least about 0.1 and more preferably at least about 0.3, weight percent of at least one conjugated or nonconjugated polyene. As a general maximum, the ethylene copolymer components of the TPO compositions of this invention comprise not more than about 85, preferably not more than about 75 and more preferably not more than about 55, weight percent ethylene; not more than about 80, preferably not more than about 70 and more preferably not more than about 60, weight percent of at least one α-olefin; and, if a terpolymer, not more than about 15, preferably not more than about 12 and more preferably not more than about 10, weight percent of at least one of a conjugated or nonconjugated diene. All weight percentages are based on weight of the blend. Comonomer content may be determined using infrared spectroscopy according to ASTMD-2238, Method B.

Ethylene copolymers can be divided into two broad classes, heterogeneously branched and homogeneously branched. The heterogeneously branched ethylene copolymers also fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 grams per cubic centimeter (g/cc).

The latter, i.e., ethylene homopolymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is a homopolymer of ethylene, and it contains relatively few branch chains relative to the various linear copolymers of ethylene and an α-olefin. Linear low density polyethylene (LLDPE) is a typical ethylene copolymer, e.g., a copolymer of ethylene and an α-olefin of 3 to 12 carbon atoms, that has sufficient α-olefin content to reduce the density of the copolymer to that of LDPE or lower.

Heterogeneously branched ethylene copolymers are not used in the practice of this invention other than as an optional component, e.g., as a third component of a TPO composition comprising a propylene and at least one homogeneously branched ethylene copolymer of low crystallinity and in which at least one α-olefin comonomer of the copolymer contains at least 4 carbon atoms. Further, highly crystalline or cross-linked semi-crystalline ethylene copolymers are not desirable in the compositions of the invention because such material would undesirably increase the flex modulus of the compositions.

The homogeneously branched ethylene copolymers that can be used in the practice of this invention also fall into two broad categories, the linear homogeneously branched and the substantially linear homogeneously branched. Semi-crystalline (having at least about 13% crystallinity) types of both are well-known and commercially available. The former and their method of preparation are described in U.S. Pat. No. 3,645,992 to Elston, and the latter and their method of preparation are fully described in U.S. Pat. Nos. 5,272,236, 5,278,272 and 5,408,004 all of which are incorporated herein by reference. Examples of the former are the Tafmer™ polymers of Mitsui and the Exact™ polymers of Exxon, while an example of the latter are the Affinity™ and Engage™ polymers made by the The Dow Chemical Company.

As here used, "substantially linear" means that the polymer backbone is substituted with about 0.01 long-chain branches/1000 carbons to about 3 long-chain branches/1000 carbons, more preferably from about 0.01 long chain branches/1000 carbons to about 1 long-chain branch/1000 carbons, especially from about 0.05 long-chain branches to about 1-long-chain branch/1000 carbons. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique polymers (subsequently referred to as "substantially linear ethylene copolymers") are prepared by using constrained geometry catalysts (CGC), and are characterized by a narrow molecular weight distribution. Other basic characteristics of these substantially linear ethylene copolymers include a low residuals content (i.e., low concentrations in the substantially linear ethylene copolymer of the catalyst used to prepare the polymer, unreacted comonomers, and low molecular weight oligomers made during the course of the copolymerization), a narrow comonomer distribution with respect to substantially linear ethylene interpolymers, and a controlled molecular architecture which provides good processability even though the molecular weight distribution is narrow relative to conventional olefin polymers.

The substantially linear ethylene copolymers that can be used in the practice of this invention typically have a melt ratio, measured as $I_{10}/I_2$ at 190° C. (ASTM D-1238), that is greater than or equal to 1.5, and is preferably from about 2.5 to 12, more preferably from about 3 to 9. The molecular weight distribution ($M_w/M_n$), measured by gel permeation chromatography (GPC), is preferably between about 1.8 and 3.0. For these substantially linear ethylene copolymers, the $I_{10}/I_2$ ratio indicates the degree of long-chain branching, i.e., the larger the $I_{10}/I_2$ ratio, the more long-chain branching in the polymer.

The unique characteristic of the homogenously branched, substantially linear ethylene copolymers is a highly unexpected flow property where the $I_{10}/I_2$ value of the polymer is essentially independent of the polydispersity index (i.e., $M_w/M_n$) of the polymer. This is contrasted with conventional linear homogeneously branched and heterogeneously branched polyethylene resins having rheological properties such that to increase the $I_{10}/I_2$ value the polydispersity index must also be increased.

Substantially linear ethylene copolymers also have a critical shear rate at onset of surface melt fracture of at least 50 percent greater than the critical shear rate at the onset of surface melt fracture of a linear olefin polymer having about the same $I_2$ and Mw/Mn.

The preferred melt index of the substantially linear ethylene copolymers (measured by ASTM D-1238, condition 190/2.16 (formerly condition E)) is from about 0.1 g/10 min to 100 g/10 min, more preferably 0.3 to 70 g/10 min, most preferably 0.5 to 50 g/20 min. Typically, the preferred substantially linear ethylene copolymers used in the practice of this invention are homogeneously branched and do not have any measurable high density fraction, i.e., short chain branching distribution as measured by Temperature Rising Elution Fractionation which is described in U.S. Pat. No. 5,089,321 the disclosure of which is incorporated herein by reference or stated in another manner. These preferred substantially linear ethylene copolymers also consist of a single differential scanning calorimetry (DSC) melting peak.

The density of the ethylene copolymer used in the TPO compositions of this invention is typically between about 0.850 and about 0.87 grams per cubic centimeter (g/cm$^3$), preferably between about 0.850 and about 0.865 g/cm$^3$, and more preferably between about 0.850 and about 0.860 g/cm$^3$. Additionally, the ethylene copolymer used in the invention has a process rheology ratio (PRR) of less than 4.0. Further, the ethylene copolymer used in the TPO compositions of this invention is "substantially amorphous". That is the crystallinity of the ethylene copolymer used in the TPO compositions of this invention is low, i.e., amorphous or near amorphous. Typically the crystallinity of the ethylene copolymer is less than about 3%, preferably less than about 2% and more preferably less than about 1%. In contrast, polymers that are crystalline or semi-crystalline have at least 9% crystallinity, more likely at least about 13% crystallinity.

Typically, the TPO compositions of this invention comprise at least about 1 percent, preferably at least about 20 percent, more preferably at least about 40 percent and even more preferably at least about 50 percent, based on the weight of the polypropylene(s) plus the substantially amorphous ethylene copolymer(s), of the substantially amorphous ethylene copolymer(s). In a preferred embodiment of this invention, the ethylene copolymer is at least one substantially linear homogeneously branched ethylene copolymer, e.g., Engage™ ethylene copolymer from DuPont Dow Elastomers L.L.C. The remainder of the blend comprises one or more, preferably one, polypropylenes.

One preferred TPO composition of the invention comprises in weight percent based upon the weight of components A and B, about:

A. 25 to 75 percent of at least one polypropylene homopolymer or a copolymer comprising up to about 30 mole percent ethylene;

B. 75 to about 25 percent of at least one substantially amorphous, substantially linear ethylene/1-butene copolymer with a crystallinity of less than about 3 percent.

Another preferred embodiment of this invention is a TPO composition comprising, in weight percent based upon the weight of components A and B, about:

A. 25 to 75 percent of at least one polypropylene homopolymer or a copolymer comprising up to about 30 mole percent ethylene;

B. 75 to about 25 percent of at least one substantially amorphous, substantially linear ethylene/1-hexene copolymer with a crystallinity of less than about 3 percent.

Another preferred embodiment of this invention is a TPO composition comprising, in weight percent based upon the weight of components A and B, about:

A. 25 to 75 percent of at least one polypropylene homopolymer or a copolymer comprising up to about 30 mole percent ethylene;

B. 75 to about 25 percent of at least one substantially amorphous, substantially linear ethylene/1-octene copolymer with a crystallinity of less than about 3 percent.

The components of the TPO composition of this invention are mixed with one another in any conventional manner that insures the creation of a relatively homogeneous blend. If the blend is molded into a finished article by extrusion, the individual components are typically introduced into the extruder separately and mixed within it prior to extrusion. If the blend is molded by a compression or injection technique, then the components are first well mixed by any conventional means, e.g., roller mill, agitator, etc. and then introduced as a homogenous mass into the mold.

The TPO compositions of this invention is not limited to, but can also include up to about 40 weight percent, based on the weight of the composition, of various additives, such as fillers (e.g., talc), cross-linking agents, cross-linking coagents, UV stabilizer reinforcing agents, colorants, antioxidants, antistatic agents, slip agents, tackifiers, plasticizers, fragrances and the like. If used, these additives are incorporated by known methods in known amounts. The TPO compositions of this invention can also be blended with up to about 30 weight percent, based on the weight of the composition, of other polymers, e.g., other polyolefins (e.g., heterogeneously branched ethylene copolymers, post-consumer recycle polyolefins, etc.), elastomers (e.g., hydrogenated styrene-butadiene-styrene block copolymers where the unsaturation is reduced/eliminated on at least one of the styrene and butadiene blocks, butyl rubber or partially hydrogenated SEBS block copolymers), polyurethanes, polycarbonates, and styrenic polymers such as polystyrenes and impact polystyrenes including styrene-butadiene-styrene block copolymers, styrene-isoprene-styrene polymers and styrene-butadiene-butylene-styrene block copolymers, using known blending techniques. The amount of the other polymer/elastomer used in the TPO composition will depend, of course, upon the application in which the blend is used.

The TPO compositions of this invention exhibit several desirable properties, often exhibited in combination with one another. First, these compositions demonstrate an unexpectedly lower modulus than that exhibited by blends of polypropylene and conventional and/or metallocene-based amorphous EP or EPDM rubbers. This, in turn, allows for the use of the compositions of this invention in soft touch applications with little, if any, plasticizer.

Second, the compositions of this invention often exhibit higher impact and/or tensile properties than that exhibited by compositions of polypropylene and conventional and/or metallocene-based amorphous EP and EPDM rubbers. This is an important property in certain commercial applications, such as molded, exterior automobile parts.

The fabricated articles of this invention are prepared by known thermoplastic fabrication methods, and particularly by known thermoplastic molding methods, such as injection, compression, blow, rotational, extrusion, reaction, and injection molding techniques. Soft touch applications for which the compositions of this invention are useful include automotive overshoot parts, toothbrush handles, shoe soles, grips, skins, toys, appliance moldings and fascia, gaskets, furniture moldings and the like.

The following examples are illustrative of certain specific embodiments of the invention. All parts and percentages are by weight unless otherwise noted.

EXAMPLES

Ethylene/α-Olefin Copolymers

The properties of the copolymers reported in Tables I and II were measured in accordance with standard ASTM procedures with the following additions:

Differential Scanning Calorimetry (DSC) was used to define the relative percent crystallinity for each copolymer (i.e., ratio area under the heat flow versus temperature curve for sample to theoretical value for 100 crystalline polyethylene).

The glass transition temperature (Tg) was determined via DSC using the inflection point of heat flow versus temperature curve during heating of an annealed sample from −100° C. and Rheometrics Solids Analysis (RSA Model II), by noting the beta peak for a 23 mm (L)×5 mm (W)×0.2 mm (T) compression molded film sample tested in a tension-compression mode with a frequency of 10 rad/sec: 1.6 Hertz.

Rheology comparisons were conducted on an Advanced Rheometric Expansion System (ARES) instrument from Rheometric Scientific having 25 mm diameter parallel plates with approximately a 2 mil gap in the oscillator shear mode with parallel plates at a 15% strain, a 2000 gram transducer and a nitrogen purge. Measurements were taken at 5 points per decade from 0.1 radians per second to 100 radians per second.

Intrinsic Viscosity (IV) measurements were made on a Viscotek Y-type viscometer at 135° C. using decalin as the solvent. A Solomon-Gatesman correction was used the calculate the intrinsic viscosity from the inherent viscosity.

Molecular Weight ($M_w$) was measured by gel permeation chromatography (GPC).

All ASTM samples were prepared by injection molding on a 100 ton Arburg molding machine. Molding temperatures for the barrel were set at 120° C. (feed), 195° C., 220° C., 230° C., and 220° C. (barrel through nozzle), while the mold temperature was 35° C. Injection cycles were maintained at 1.8 seconds (sec.) injection, 30 sec. hold and 20 sec. cool. The injection/hold pressures were approximately 500 bars which was adjusted to completely fill the mold cavities.

Table I reports various physical properties of a substantially linear ethylene/1-octene copolymers at various crystallinities.

TABLE I

| | Ethylene/Octene Copolymer Properties | | | |
|---|---|---|---|---|
| Example Number | 1 | 1A | 1B | 1C |
| $I_2$ (190° C./2.16 Kg) | 3.9 | 1.4 | 1 | 0.5 |
| Mooney (125° C. 1 + 4) | 9 | 17 | 20 | 30 |
| Intrinsic Viscosity (IV) | 1.433 | 1.486 | 1.518 | 2.001 |

TABLE I-continued

Ethylene/Octene Copolymer Properties

| Example Number | 1 | 1A | 1B | 1C |
|---|---|---|---|---|
| Rheology (190° C.): | | | | |
| 0.1 (rad./sec.) | 27,938 | 56,234 | 75,066 | 164,720 |
| 10 (rad./sec.) | 18,502 | 34,827 | 43,102 | 68,012 |
| 100 (rad./sec.) | 7,333 | 13,301 | 11,000 | 20,695 |
| Rheo. Ratio (0.1/100) | 3.81 | 4.23 | 6.82 | 7.96 |
| Differential Scanning Calorimetry (DSC): | | | | |
| Tg | −65 | −62 | −58 | −55 |
| peak Tc | 41 | 0 | 19 | 35 |
| peak Tm | −28 | −17 to 15 | 37 | 49 |
| Crystallinity (%) | 0.8 | 5.7 | 12.3 | 15.5 |
| Mol. Wt. ($M_w$) | 155,200 | 146,100 | 148,000 | 159,100 |
| Density (gm/cc) | 0.852 | 0.854 | 0.858 | 0.863 |

Table II reports the physical properties for a homogeneously branched ethylene/1-butene copolymer at varying crystallinities.

TABLE II

Ethylene/Butene Copolymer Properties

| Example Number | 2 | 2A | 2B |
|---|---|---|---|
| $I_2$ (190° C./2.16 Kg) | 0.73 | 0.49 | 0.40 |
| Mooney (125° C. 1 + 4) | 27.5 | 28.7 | 29.5 |
| IV | 2.022 | 2.07 | 2.154 |
| Rheology (190° C.): | | | |
| 0.1 (rad./sec.) | 117640 | 200290 | 222000 |
| 10 (rad./sec.) | 58655 | 62053 | 64381 |
| 100 (rad./sec.) | 19382 | 21977 | 23332 |
| Rheo. Ratio (0.1/100) | 6.07 | 9.11 | 9.51 |
| DSC: | | | |
| Tg | −62 | −58 | −54 |
| Peak Tc | | 3 | 22 |
| Peak Tm | | 18 | 39 |
| Crystallinity (%) | 0 | 6.9 | 14.1 |
| Mol. Wt. ($M_w$) | 167,300 | 139,200 | 134,500 |
| Density (gm/cc) | 0.852 | 0.855 | 0.865 |

TPO Compositions

The properties of the TPO compositions reported in the following Tables were measured in accordance with standard ASTM procedures with the following additions:

Notched Izod values were obtained using an Izod tester and a low speed notcher equipped with a 10 mil wheel (D-256). Unnotched weldline Izod samples were cut from the middle of a double gated tensile bar and tested on the Izod impact tester.

Dart impact results were obtained using a Dynatup model 8250 Impact Tester having a ½" dart weighing 100 pounds, a 1½ inch support and a speed of 8050 inches/minute.

All ASTM samples were prepared by injection molding on a 100 ton Arburg molding machine. Molding temperatures for the barrel were set at 120° C. (feed), 195° C., 220° C., 230° C., and 220° C. (barrel through nozzle), while the mold temperature was 35° C. Injection cycles were maintained at 1.8 seconds (sec.) injection, 30 sec. hold and 20 sec. cool. The injection/hold pressures were approximately 500 bars which was adjusted to completely fill the mold cavities.

Weldline samples were produced by injecting the tensile bars via two opposing end gates in the same mold (i.e., fill gates at each end of the tensile bar). Weldline strength were tested via room temperature Izod impact (un-notched) and uni-axial tensile.

30 weight percent, based on the weight of the ethylene copolymer plus the polypropylene, of the ethylene/1-octene copolymer described above in Table I was melt blended in a Banbury mixer and then pellitized in an extruder with 70 weight percent, based on the weight of the ethylene copolymer plus the polypropylene, of Accpro™ 9934 (a high crystalline polypropylene homopolymer of 35 $I_2$ manufactured by Amoco). Irganox™ 1076 (an antioxidant manufactured by Ciba-Geigy) was added in an amount of 0.2 weight percent of the composition. The properties of this formulation at various crystallinities of the ethylene/1-octene copolymer are reported in Table III.

TABLE III

EO Copolymers with High Crystalline Polypropylene Homopolymer

| Ethylene/1-Octene Copolymer Example Number | 1 | 1A | 1B | 1C |
|---|---|---|---|---|
| $I_2$, g/cc at 230° C., 2.16 Kg | 29.6 | 21.5 | 21.2 | 16.7 |
| Shore D, 10 sec. | 50 | 50.2 | 56.3 | 61.9 |
| Break Tensile, psi | 2530 | 2335 | 2350 | 2356 |
| Elongation at Break, % | 691 | 576 | 142 | 183 |
| Flexural Modulus, psi | 121,924 | 154,235 | 171,525 | 178,685 |
| Dart Impact, ft lb | | | | |
| 23° C. | 24.9 | 26.2 | 28.3 | 27.3 |
| −30° C. | 33.0 | 33.1 | 35.9 | 36.8 |
| −40° C. | 34.3 | 32.7 | 33.9 | 25.3 |
| Izod Impact, ft lbs/in | | | | |
| 23° C. | 12.4 | 12.2 | 12.5 | 10.7 |
| 0° C. | 12.0 | 9.9 | 8.7 | 1.7 |
| −20° C. | 2.0 | 1.6 | 1.5 | 1.5 |
| Weldline Izod, ft lbs/in | 3.3 | 3.5 | 2.6 | 3.4 |
| Heat Distortion Temp. (HDT) @ 66 psi, ° C. | 87 | 91 | 96 | 99 |

Figure 1:
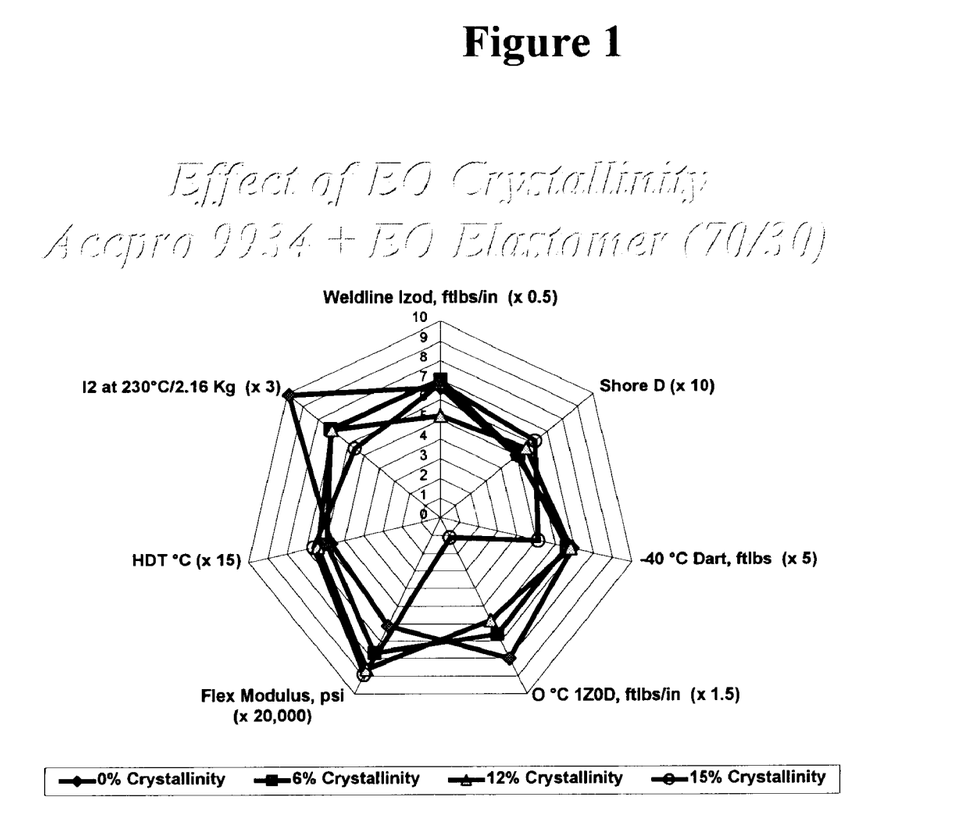
FIG. 1 is a graphic representation of the effect of the crystallinity of ethylene/1-octene elastomers on a blend of polypropylene and the ethylene/1-octene elastomer.

The data of Table III shows that the flow as measured by $I_2$, break tensile, low temperature impact and Izod impact of the TPO composition made with the substantially amorphous EO copolymer is markedly superior and the flexural modulus is markedly lower to that of the TPO compositions made with the crystalline EO copolymers. The data presented in Table III is graphically represented in FIG. 1.

30 weight percent, based on the weight of the ethylene copolymer plus the polypropylene, of the ethylene/1-butene copolymer described in Table II was also melt blended in a Banbury mixer and then pellitized in an extruder with 70 weight percent, based on the weight of the ethylene copolymer plus the polypropylene, of Accpro™ 9934. Irganox™ 1076 was added in an amount of 0.2 weight percent of the composition. The properties of this formulation at various crystallinities of the ethylene/1-butene copolymer are reported in Table IV.

TABLE IV

E/B Copolymers with High Crystalline Polypropylene Homopolymer

| Ethylene/1-Butene Copolymer Example Number | 2 | 2A | 2B |
|---|---|---|---|
| I₂, 230° C./2.16 Kg | 17.3 | 17.1 | 16.3 |
| Shore D, 10 Sec. | 53 | 56 | 61 |
| Break Tensile, psi | 2574 | 2251 | 2098 |
| Elongation at Break, % | 682 | 520 | 204 |
| Flexural Modulus, psi | 125,119 | 168,716 | 178,512 |
| Dart Impact, ft lb | | | |
| 23° C. | 23.3 | 23.7 | 24.2 |
| −30° C. | 34.6 | 33.9 | 22.8 |
| −40° C. | 41.2 | 34.4 | 19.1 |
| Izod Impact, ft lbs/in | | | |
| 23° C. | 12.3 | 10.6 | 1.6 |
| 0° C. | 11.6 | 2.0 | 1.4 |
| −20° C. | 6.9 | 1.8 | 1.3 |
| Weldline Izod, ft lbs/in | 4.3 | 2.4 | 1.7 |
| HDT @ 66 psi, ° C. | 90 | 94 | 95 |

Figure 2:
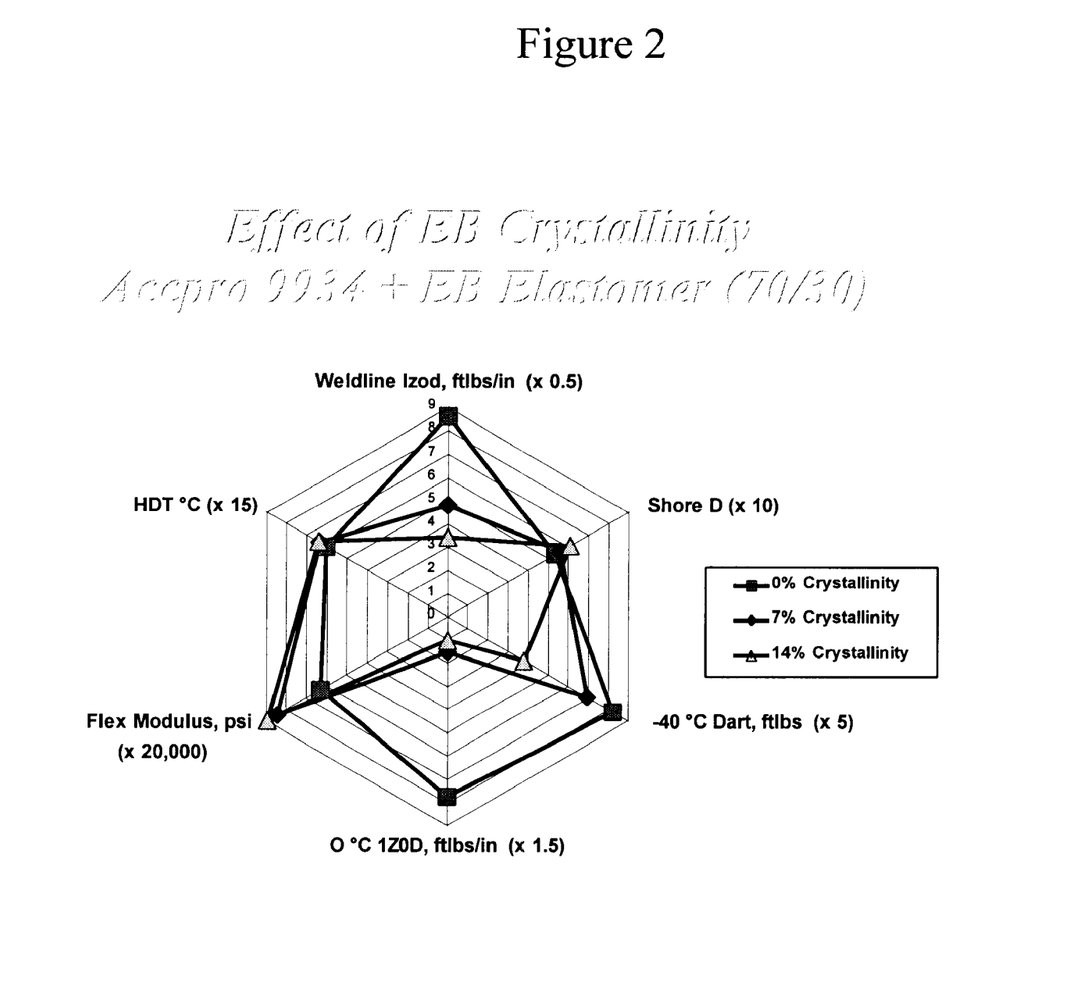
FIG. 2 is a graphic representation of the effect of the crystallinity of ethylene/1-butene elastomers on a blend of polypropylene and the ethylene/1-butene elastomer.

The data of Table IV also shows that the break tensile, low temperature impact and Izod impact of the TPO composition made with the substantially amorphous EB copolymer are markedly superior and the flexural modulus is markedly lower to that of the TPO compositions made with the crystalline EO copolymers. In addition, the elongation at break and the weldline Izod are also superior for the TPO composition made with the amorphous EB copolymer as compared with the TPO compositions made with crystalline EB copolymer. The data of Table IV is graphically presented in FIG. 2.

Comparison of Inventive TPO Compositions with Known TPO Compositions:

The physical properties of various known TPO compositions are compared with like properties of several TPO compositions of this invention in Table V. The first column reports the physical property and the ASTM test by which it was measured. Each TPO composition comprised 70 weight percent Accpro™ 9934 polypropylene and 30 weight percent of an ethylene copolymer. Royalene™ 521 was a 28 mooney, substantially amorphous, conventional EPDM from Uniroyal. Nordel® IP 3430 was a 30 mooney, substantially amorphous, homogeneously branched (made by metallocene catalysis) EPDM from DuPont Dow Elastomers L.L.C. Vistalon 457 was a 25 mooney, substantially amorphous, conventional EP rubber from Exxon Chemical. EPI was an 20 mooney, substantially amorphous, homogeneously branched (made with Insite™ Technology, i.e., using a constrained geometry catalyst (CGC)) ethylene/propylene copolymer from DuPont Dow Elastomers L.L.C. EBI was a 20 mooney, substantially amorphous, homogeneously branched (made with Insite™ Technology, i.e., using a CGC) ethylene/1-butene copolymer from DuPont Dow Elastomers L.L.C. EOI was a 9 mooney, substantially amorphous, homogeneously branched (made with Insite™ Technology, i.e., using a CGC) ethylene/1-octene copolymer from DuPont Dow Elastomers L.L.C. SC EBI was a 30 mooney semi-crystalline (7% crystallinity), homogeneously branched (made with Insite™ Technology, i.e., using a CGC) ethylene/1-butene copolymer from DuPont Dow Elastomers L.L.C.

TABLE V

TPO Compositions Comprising a Substantially Amorphous Ethylene/α-Olefin Copolymer and a High Crystalline Polypropylene

| | Sample Name: | | | | | | |
|---|---|---|---|---|---|---|---|
| | Royalene 521 | Nordel IP 3430 | Vistalon 457 | EPI | EBI | EOI | SC EBI |
| Shore A Hardness (D-2240) | | | | | | | |
| 1 second | 97.2 | 97.2 | 96.2 | 97.6 | 97.1 | 95.9 | 96.7 |
| 10 second | 97.3 | 97.2 | 96.2 | 97.7 | 97.1 | 95.8 | 96.7 |
| Shore D Hardness (D-2240) | | | | | | | |
| 1 second | 57.6 | 58.9 | 55.7 | 56.9 | 56.4 | 54.8 | 62.1 |
| 10 second | 52.6 | 54.6 | 52.0 | 53.0 | 50.8 | 49.7 | 55.8 |
| Tensile @ 2"/min (D-6382) | | | | | | | |
| Tensile @ Break (PSI) | 2087 | 2077 | 1128 | 2120 | 2293 | 2530 | 2251 |
| Ult. Elongation (%) | 131 | 181 | 221 | 309 | 644 | 691 | 520 |
| Tensile @ Yield (PSI) | 2899 | 3083 | 2814 | 2971 | 2640 | 2474 | 3207 |
| Elong @ Yield (%) | 6 | 5 | 9 | 6 | 12 | 11 | 7 |
| Rheometry (dg/10 min) (D-1238) 12 @ 230° C./2.16 kg | 18.42 | 16.28 | 18.45 | 17.21 | 20.07 | 29.59 | 17.07 |

TABLE V-continued

TPO Compositions Comprising a Substantially Amorphous
Ethylene/α-Olefin Copolymer and a High Crystalline Polypropylene

| | Sample Name: | | | | | | |
|---|---|---|---|---|---|---|---|
| | Royalene 521 | Nordel IP 3430 | Vistalon 457 | EPI | EBI | EOI | SC EBI |
| Weld Line @ 2"/min (D638) | | | | | | | |
| Tensile @ Break (PSI) | 1346 | 1315 | 1533 | 1346 | 1409 | 1278 | 1843 |
| Ult. Elongation (%) | 1 | 1 | 2 | 2 | 2 | 1 | 1 |
| Tensile @ Yield (PSI) | 1346 | 1309 | 1046 | 871 | 1138 | 831 | 1834 |
| Elong @ Yield (PSI) | 1 | 1 | 1 | 1 | 1 | 0 | 1 |
| 3-Point Flex (D-790) | | | | | | | |
| Flex Modulus (PSI) | 148,866 | 169,261 | 136,789 | 151,073 | 127,126 | 121,924 | 168,716 |
| 2% Secant Modulus (PSI) | 131,381 | 151,032 | 128,316 | 136,192 | 111,173 | 110,932 | 150,991 |
| Gloss (D-523) | | | | | | | |
| 20° | 36.5 | 41.6 | 67.2 | 56.9 | 21.5 | 43.6 | 53.4 |
| 60° | 54.1 | 61.5 | 83.3 | 73.3 | 56.4 | 73.3 | 70.7 |
| 85° | 88.8 | 90.3 | 98.3 | 97.5 | 96.7 | 95.1 | 93 |
| Dynatup Total Energy (ft-lb) (D-5628) | | | | | | | |
| 23° C. | 22.9 | 21.3 | 22.5 | 27.6 | 27.3 | 24.9 | 23.7 |
| −30° C. | 16.8 | 21.6 | 31.4 | 21.1 | 36.5 | 33.0 | 33.9 |
| −40° C. | 19.2 | 29.2 | 39.3 | 37.8 | 39.8 | 32.3 | 34.4 |
| Izod Impact Strength (ft-lbs/in) (D-256) | | | | | | | |
| 23° C. | 1.30 | 1.46 | 2.02 | 1.61 | 11.56 | 12.41 | 10.59 |
| 0° C. | 0.92 | 1.25 | 1.49 | 1.39 | 10.23 | 12.00 | 1.98 |
| −20° C. | na | 1.10 | na | na | 1.64 | 2.03 | 1.82 |
| −30° C. | 0.85 | 0.98 | na | na | 1.59 | 1.67 | 1.59 |
| RT Weldline Izods (ft-lbs/in) | 0.70 | 0.88 | 1.67 | 1.20 | 6.24 | 3.30 | 2.36 |
| Heat Distortion @ 66 psi HDT in °C. (D-648) | 92.8 | 97.4 | 82.5 | 91.0 | 92.7 | 97.3 | 98.4 |

Figure 3:
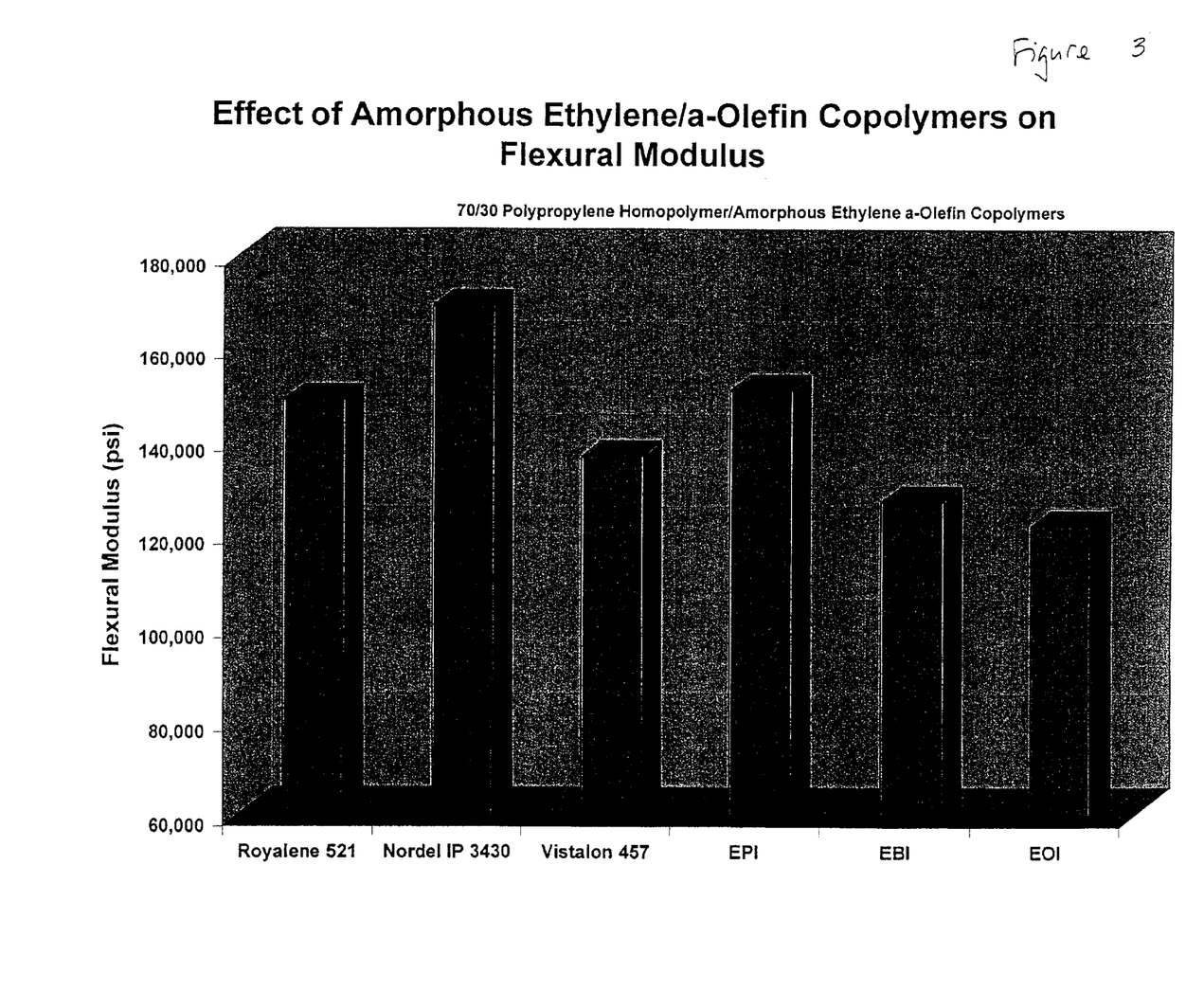
FIG. 3 is a graphic representation of the flexural modulus of the TPO compositions reported in Table V.
Figure 4:
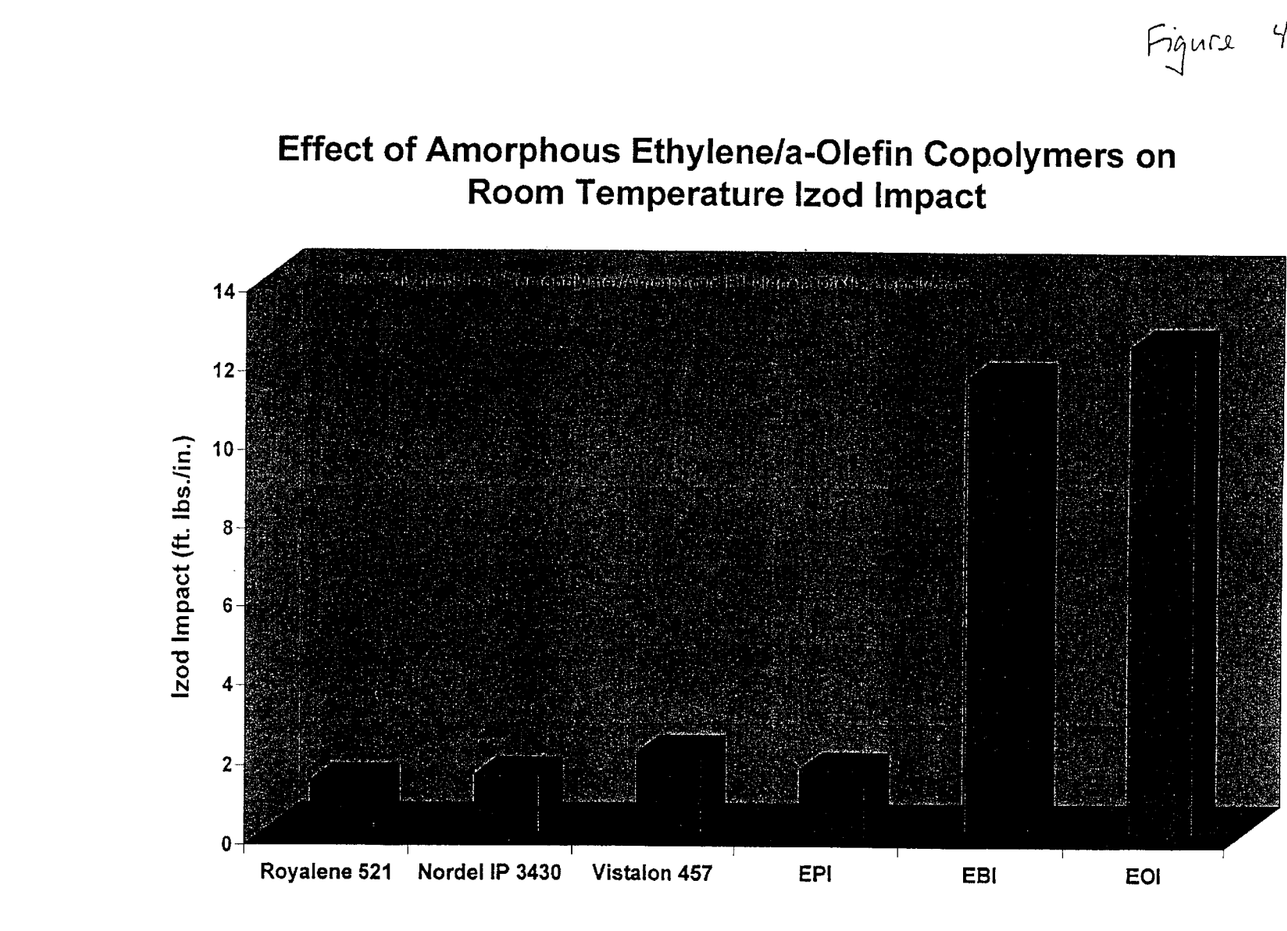
FIG. 4 is a graphic representation of the 23° C. Izod Impact of the TPO compositions reported in Table V.
Figure 5:
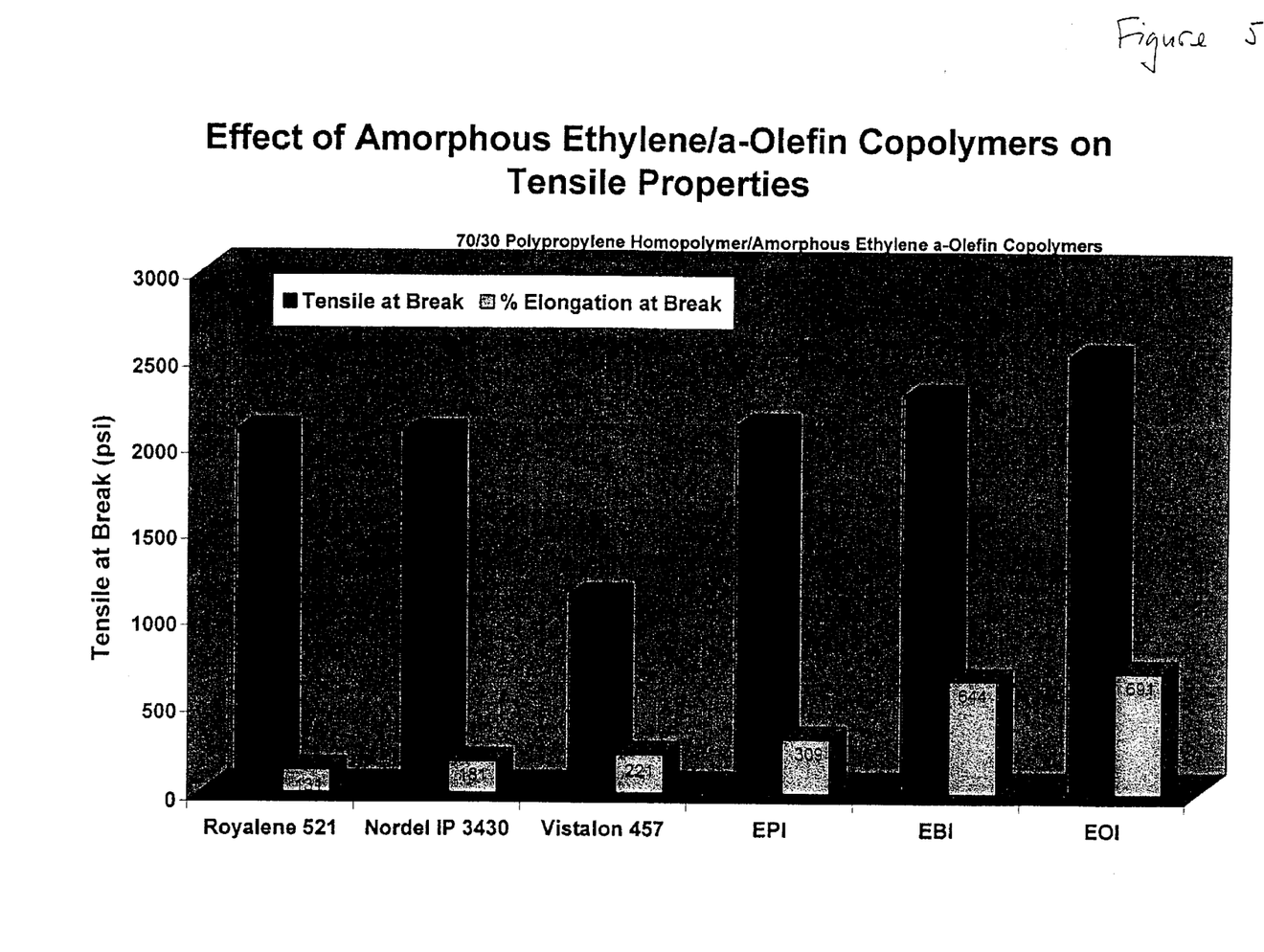
FIG. 5 is a graphic representation of the tensile properties of the TPO compositions reported in Table V.

The data of Table V shows that Shore D Hardness (particularly the 10 second) and flex and 2% secant modulus are lower; and tensile at break, rheometry, Izod impact strength and RT weldline Izods are higher for the TPO compositions of this invention, i.e., EBI and EOI, as compared not only to the commercially available TPO compositions, but also to the TPO compositions made with an EPI copolymer and a semi-crystalline EBI copolymer. Certain of the data of Table V are presented graphically in FIGS. 3–5.

The physical properties of similar but different TPO compositions are compared in Table VI. The TPO compositions reported in Table VI comprise 63 weight percent Noblen™ BJ5H (a 35 $I_2$ polypropylene copolymer available form Mitsui), 27 weight percent of an ethylene/α-olefin copolymer, 10 weight percent talc (Microtuff™ AG-101 manufactured by Specialty Minerals), and 0.2 weight percent Irganox™ 1076 antioxidant. The ethylene/α-olefin copolymer components of these compositions were the same as those used to prepare the TPO compositions reported in Table V.

TABLE VI

TPO Compositions Comprising a Substantially Amorphous
Ethylene/α-Olefin Copolymer and a Polypropylene Copolymer

| | Sample Name: | | | | | | |
|---|---|---|---|---|---|---|---|
| | Royalene 521 | Nordel IP 3430 | Vistalon 457 | EPI | EBI | EOI | SC EBI |
| Shore A Hardness (D-2240) | | | | | | | |
| 1 second | | 97.3 | | 97.5 | 96.0 | 97.7 | 96.9 | 96.8 |
| 10 second | | 97.2 | | 97.5 | 95.9 | 97.5 | 96.8 | 96.7 |

TABLE VI-continued

TPO Compositions Comprising a Substantially Amorphous
Ethylene/α-Olefin Copolymer and a Polypropylene Copolymer Sample Name:

| | Royalene 521 | Nordel IP 3430 | Vistalon 457 | EPI | EBI | EOI | SC EBI |
|---|---|---|---|---|---|---|---|
| Shore D Hardness (D-2240) | | | | | | | |
| 1 second | 54.3 | 56.0 | 51.2 | 51.8 | 54.7 | 50.8 | 60.6 |
| 10 second | 48.0 | 50.0 | 46.8 | 47.7 | 47.8 | 45.7 | 54.5 |
| Tensile @ 2"/min (D-6382) | | | | | | | |
| Tensile @ Break (PSI) | 1710 | 2204 | 1659 | 1657 | 1467 | 1810 | 2858 |
| Ult. Elongation (%) | 91 | 56 | 83 | 90 | 188 | 518 | 614 |
| Tensile @ Yield (PSI) | 2183 | 2675 | 2239 | 2198 | 2057 | 1914 | 2816 |
| Elong @ Yield (%) | 5 | 6 | 6 | 5 | 9 | 13 | 11 |
| Rheometry (dg/10 min) (D-1238) 12 @ 230° C./ 2.16 kg | 15.32 | 13.50 | 21.16 | 15.98 | 18.99 | 26.90 | 6.42 |
| Weld Line @ 2"/min (D-638) | | | | | | | |
| Tensile Break (PSI) | 1624 | 1566 | 1375 | 1430 | 1385 | 1200 | 1561 |
| Ult. Elongation (%) | 2 | 2 | 2 | 2 | 3 | 1 | 2 |
| Tensile @ Yield (PSI) | 1624 | 1387 | 1185 | 1129 | 927 | 1197 | 1714 |
| Elong @ Yield (PSI) | 2 | 1 | 2 | 1 | 1 | 1 | 2 |
| 3-Point Flex (D-790) | | | | | | | |
| Flex Modulus (PSI) | 137,226 | 134,824 | 140,691 | 139,040 | 112,040 | 98,440 | 167,025 |
| 2% Secant Modulus (PSI) | 106,510 | 107,474 | 112,862 | 110,458 | 89,255 | 82,090 | 130,573 |
| Gloss (D-523) | | | | | | | |
| 20° | 8.4 | 11.0 | 15.2 | 12.2 | 33.0 | 44.1 | 37.9 |
| 60° | 20.1 | 27.0 | 33.5 | 29.1 | 61.5 | 66.3 | 69.1 |
| 85° | 77.7 | 79.0 | 88.8 | 87.8 | 93.5 | 94.3 | 94.1 |
| Dynatup Total Energy (ft-lb) (D-5628) | | | | | | | |
| 23° C. | 24.0 | 25.0 | 24.2 | 25.1 | 27.8 | 25.9 | 23.2 |
| −30° C. | 29.8 | 31.0 | 29.6 | 35.8 | 39.4 | 33.2 | 34.6 |
| −40° C. | 28.4 | 32.0 | 31.9 | 36.6 | 39.0 | 32.2 | 30.3 |
| Izod Impact Strength (ft-lbs/in) (D-256) | | | | | | | |
| 23° C. | 13.64 | 12.20 | 11.48 | 11.95 | 13.05 | 14.39 | 13.54 |
| 0° C. | 4.93 | 12.30 | 12.52 | 12.89 | 13.66 | 15.64 | 10.89 |
| −20° C. | 2.93 | 3.50 | 11.76 | 5.69 | 14.12 | 12.62 | 6.7 |
| −30° C. | 2.48 | 2.00 | 7.16 | 3.26 | 14.52 | 3.87 | 3.64 |
| RT Weldline Izods (ft-lbs/in) | 3.52 | 2.30 | 2.90 | 3.72 | 3.23 | 4.52 | 2.87 |
| Heat Distortion @ 66 psi HDT in ° C. (D-648) | 72.9 | 77.4 | 79.7 | 75.3 | 75.1 | 69.1 | 90.8 |

Figure 6:
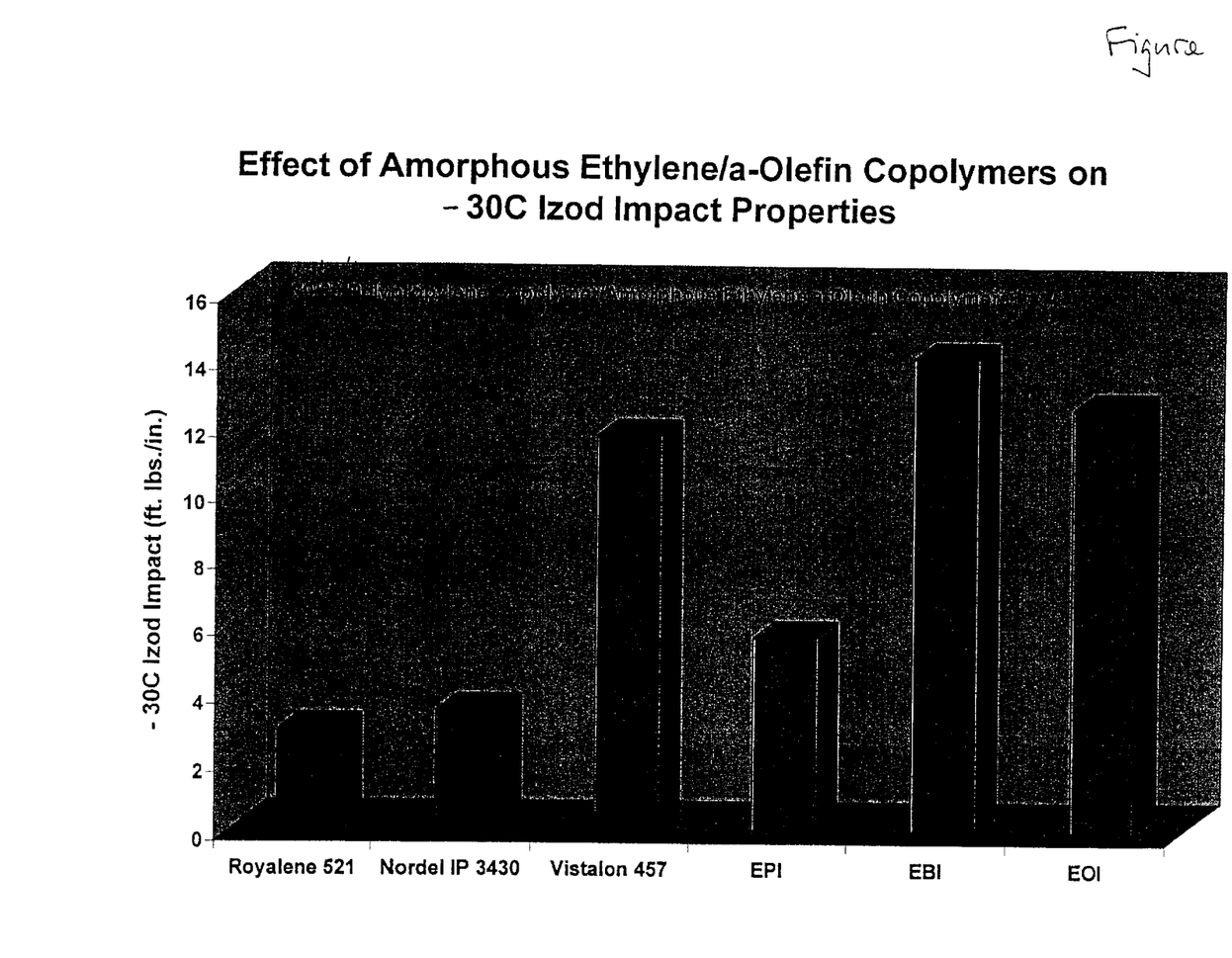
FIG. 6 is a graphic representation of the 30° C. Izod of the TPO compositions reported in Table VI.
Figure 7:
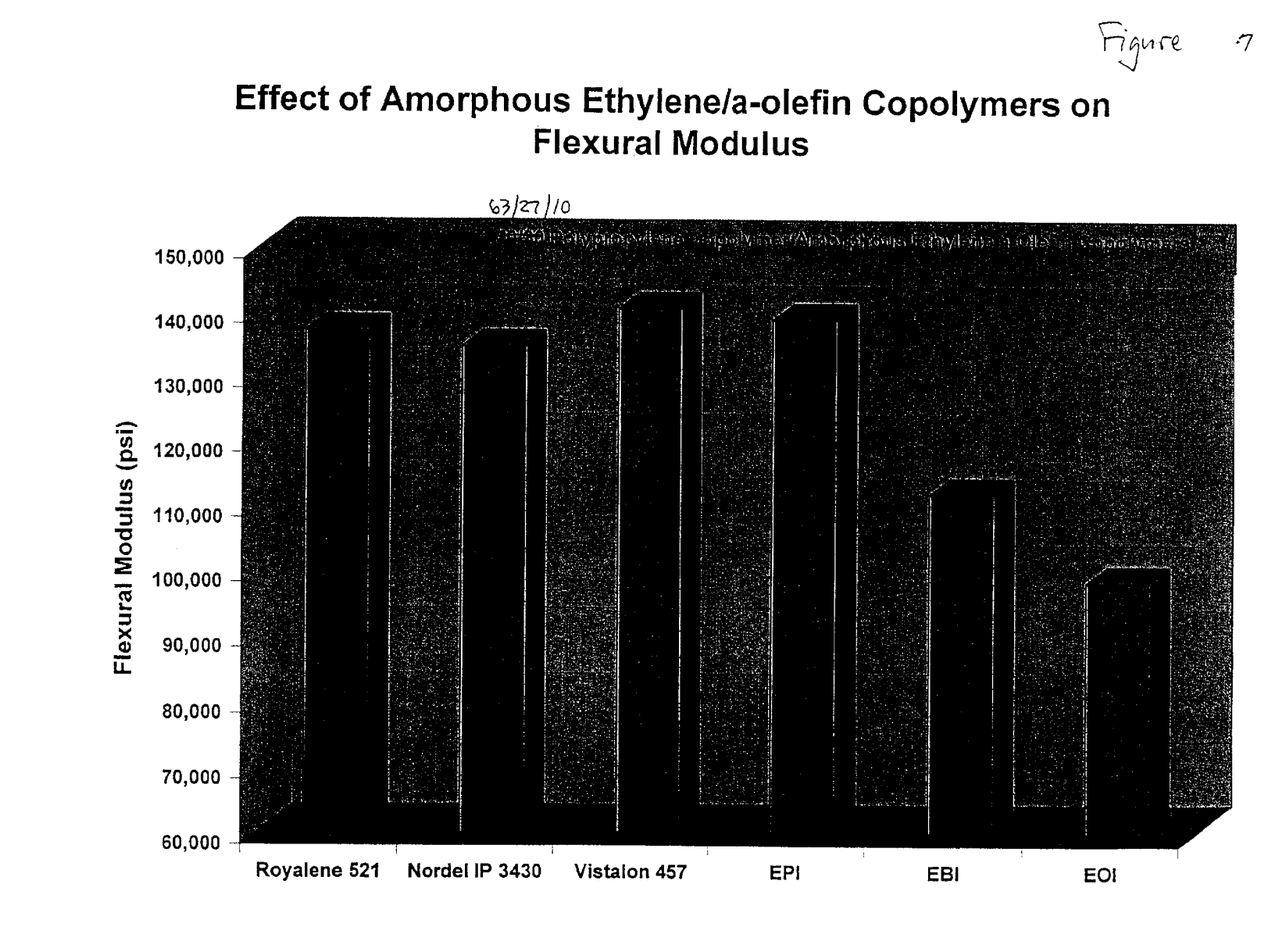
FIG. 7 is a graphic representation of the flexural modulus of the TPO compositions reported in Table VI.

The data of Table VI shows essentially the same pattern of property differences as that shown in Table V. Shore A and D Hardness and flex and 2% secant modulus (particularly modulus) are lower; and tensile at break, rheometry, Izod impact strength and RT weldline Izods are generally higher for the TPO compositions of this invention, i.e., EBI and EOI, as compared not only to the commercially available TPO compositions, but also to the TPO compositions made with an EPI copolymer and a semi-crystalline EBI copolymer. Certain of the data of Table VI is presented graphically in FIGS. 6–7.

The physical properties of a TPO composition and various TPV compositions are compared in Table VII. The TPO composition contained 50 weight percent Noblen™ BJ5H and 50 weight percent EBI copolymer (as reported for Tables V and VI). The amount of Noblen™ BJ5H varied in the TPV compositions from 60 to 40 weight percent with the remainder EBI copolymer and small amounts of DiCup R and TAC co-agent (triallylcyanurate from Cytec Industries, Inc., a peroxide cross-linking system). As the data of Table VII shows, some degree of cross-linking does not adversely impact the flexibility and strength properties of the composition in any significant manner. Further, a comparison of Samples 1 and 3 shows that flex modulus is reduced by the addition of peroxide with a coagent. Flex modulus also is reduced by the addition of peroxide alone.

TABLE VII

TPO and TPV Compositions Comprising EBI and a Polypropylene Copolymer

| | Composition number | | | |
|---|---|---|---|---|
| | 1 TPO | 2 TPV | 3 TPV | 4 TPV |
| Noblen BJ5H | 50 | 60 | 50 | 40 |
| EBI copolymer | 50 | 40 | 50 | 60 |
| DiCup R (peroxide) | 0 | 0.4 | 0.4 | 0.4 |
| TAC (co-agent) | 0 | 0.1 | 0.1 | 0.1 |

| | Sample Name: | | | |
|---|---|---|---|---|
| | 1 | 2 | 3 | 4 |
| Shore A Hardness (D-2240) | | | | |
| 1 second | 96.2 | 98.1 | 96.0 | 87.7 |
| 10 second | 94.4 | 97.6 | 94.1 | 81.8 |
| Shore D Hardness (D-2240) | | | | |
| 1 second | 34.4 | 41.9 | 32.6 | 22.4 |
| 10 second | 28.8 | 36.2 | 27.4 | 17.6 |
| Tensile @ 2"/min (D-6382) | | | | |
| Tensile @ Break (PSI) | 1122 | 1060 | 696 | 465 |
| Ult. Elongation (%) | 630 | 138 | 177 | 177 |
| Tensile @ Yield (PSI) | 958 | 972 | 702 | 268 |
| Elong @ Yield (%) | 28 | 5 | 18 | 4 |
| Rheometry (dg/10 min) (D-1238) 12 @ 190° C./2.16 kg | 7.00 | 20.01 | 9.46 | 6.70 |
| 3-Point Flex (D-790) | | | | |
| Flex Modulus (PSI) | 31,051 | 37,503 | 17,344 | 7,406 |
| 2% Secant Modulus (PSI) | 27,606 | 33,669 | 15,478 | 6,907 |
| Dynatup Total Energy (ft-lb) (D-5628) -40° C. | 23.9 | 26.3 | 25.9 | 20.7 |
| Izod Impact Strength (ft-lbs/in) (D-256) -40° C. | No break | no break | no break | no break |
| Heat Distortion @ 66 psi HDT in ° C. (D-648) | 59.0 | 58.0 | 50.0 | 48.0 |

Although the invention has been described in detail by the proceeding examples, such detail is for the purpose of illustration and it is not to be construed as a limitation upon the invention. Any variations can be made upon the proceeding examples without departing from the spirit and scope of the following claims.

What is claimed is:

1. A thermoplastic polyolefin composition comprising, in weight percent based upon the weight of components A and B, about:

A. 1 to about 99 percent of a least one polypropylene homopolymer or copolymer; and
B. 99 to about 1 percent of at least one homogeneously branched ethylene/α-olefin copolymer in which the α-olefin contains at least 4 carbon atoms and the homogeneously branched copolymer has a crystallinity of less than about 3 percent.

2. An article comprising the thermoplastic polyolefin composition of claim 1.

* * * * *